R. J. VIBBERT.
ROW GAGE ATTACHMENT FOR PLOWS.
APPLICATION FILED OCT. 18, 1911.
1,021,021.
Patented Mar. 26, 1912.
2 SHEETS—SHEET 1.
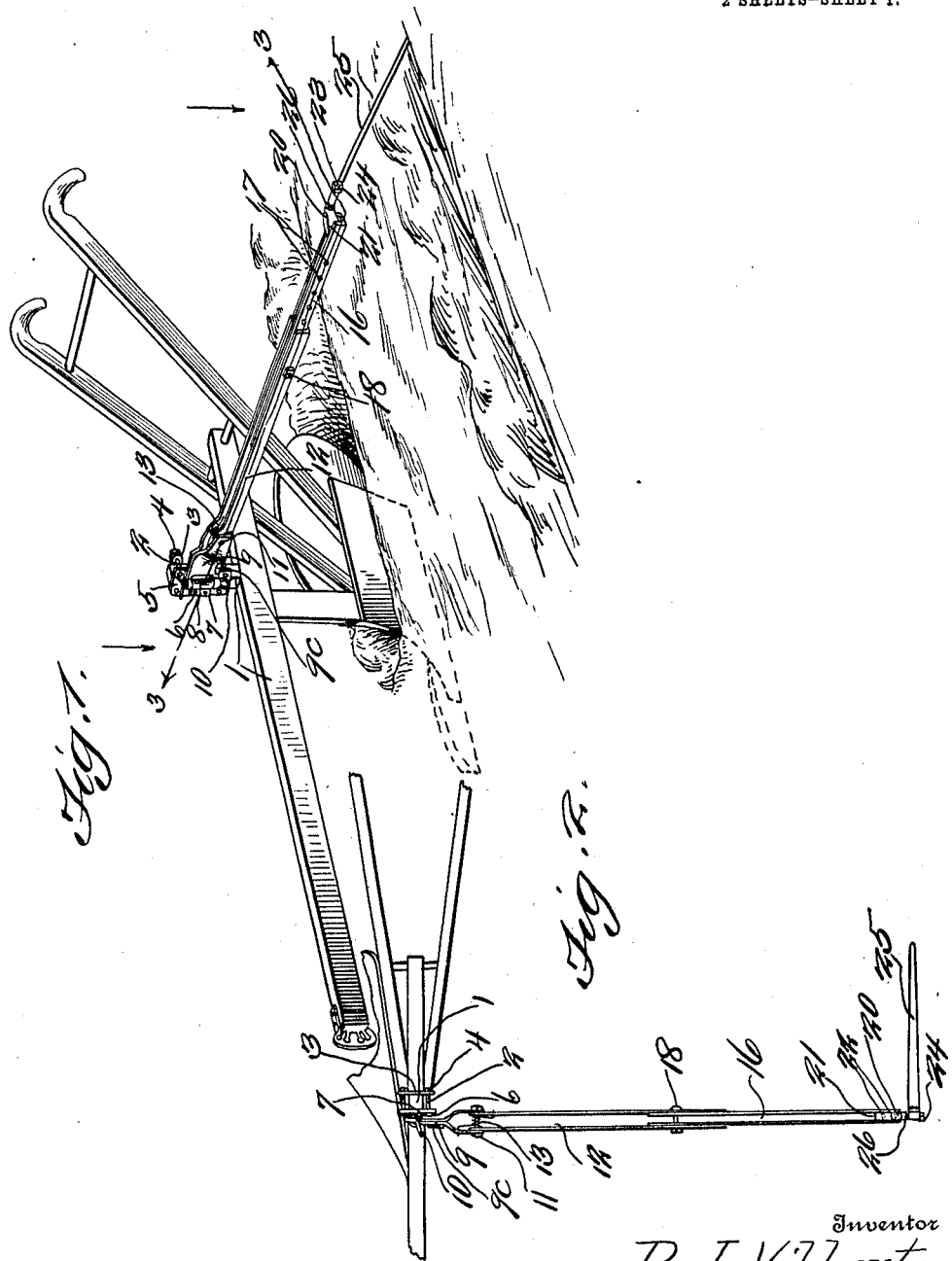
Witnesses
Francis T. Boswell,
C. C. Frothingham
Inventor
R. J. Vibbert,
By D. Swift & Co.
Attorney
COLUMBIA PLANOGRAPH CO., WASHINGTON, D. C.

R. J. VIBBERT.
ROW GAGE ATTACHMENT FOR PLOWS.
APPLICATION FILED OCT. 18, 1911.
1,021,021.
Patented Mar. 26, 1912.
2 SHEETS—SHEET 2.
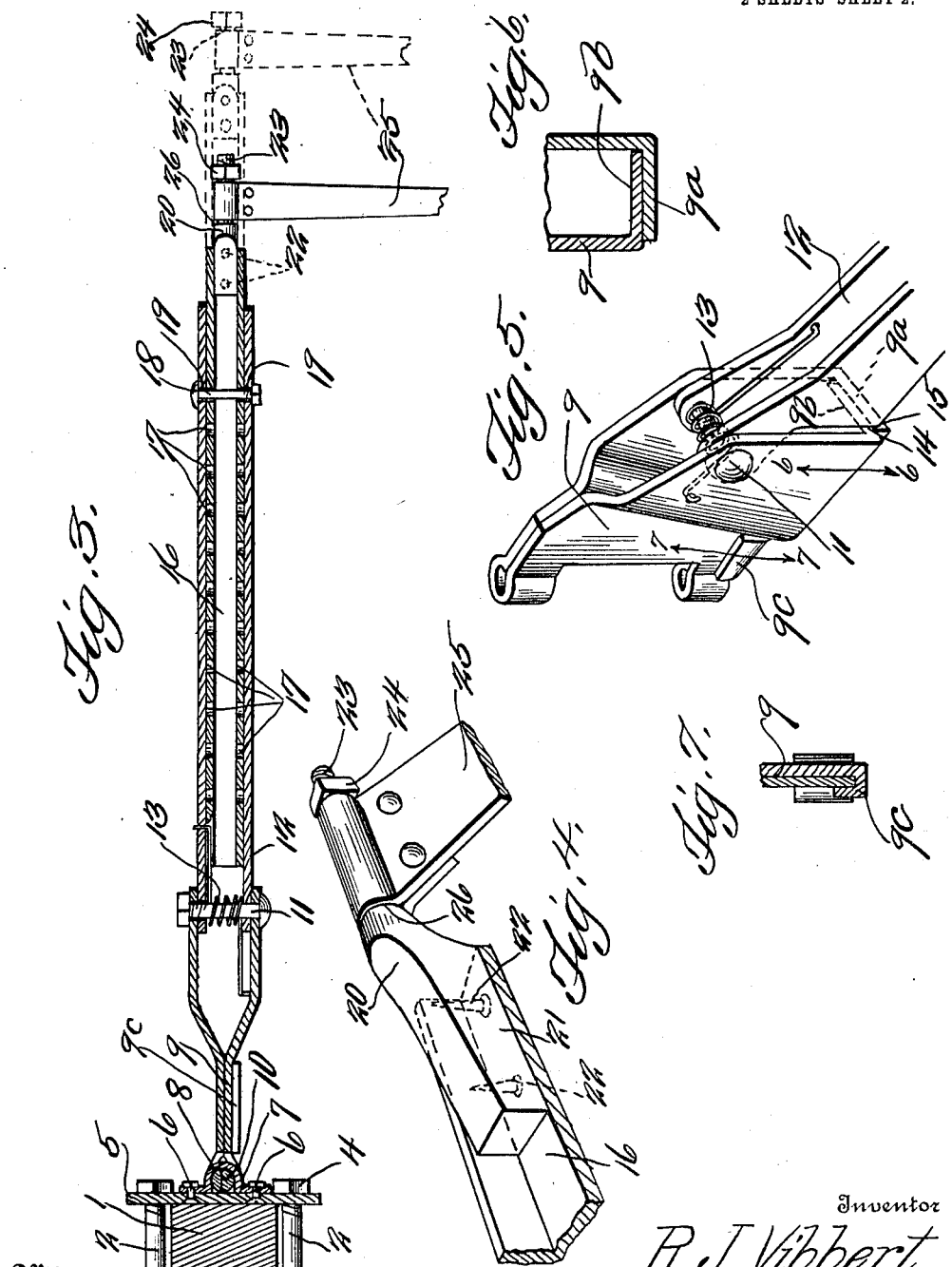
Witnesses
Francis G. Boswell
C. E. Frothingham
Inventor
R. J. Vibbert,
By D. Swift & Co.
Attorney

UNITED STATES PATENT OFFICE.

ROBERT J. VIBBERT, OF AMBROSE, GEORGIA.

ROW-GAGE ATTACHMENT FOR PLOWS.

1,021,021.  Specification of Letters Patent.   Patented Mar. 26, 1912.

Application filed October 18, 1911. Serial No. 655,403.

*To all whom it may concern:*

Be it known that I, ROBERT J. VIBBERT, a citizen of the United States, residing at Ambrose, in the county of Coffee and State of Georgia, have invented a new and useful Row-Gage Attachment for Plows; and I do hereby declare the following to be a full, clear, and exact description of the invention, such as will enable others skilled in the art to which it appertains to make and use the same.

This invention relates to a new and useful row gaging device for plows and the like.

The object of the invention is to provide a device of this nature, including a gravitating member, designed to drag in the first row or furrow while the second row is being made, and in the second row while the third row is being made, and so on through a number of rows, thereby making the distances between the rows uniform, and rendering the rows substantially parallel to one another.

A further object of the invention is the provision of means, whereby the gravitating member may be adjusted away from or toward the plow, so as to increase or decrease the distances between the rows.

The invention comprises further features and combination of parts, as hereinafter set forth, shown in the drawings and claimed.

In the drawings:—Figure 1 is a view in perspective, showing the row gaging device as applied to a plow. Fig. 2 is a fragmentary plan view of the plow also showing the device applied, illustrating the gravitating member adjusted from the plow further than that shown in Fig. 1. Fig. 3 is a sectional view on line 3—3 of Fig. 1, showing parts adjusted in dotted lines. Fig. 4 is a detail perspective view of a portion of the device. Fig. 5 is a detail perspective view of the hinge member which is hinged to a plate carried by plow beam. Fig. 6 is a sectional view on line 6—6 of Fig. 5. Fig. 7 is a sectional view on line 7—7 of Fig. 5.

Referring to the drawings 1 designates the plow beam. Clamped to the beam, by means of the bolts, the plates and nuts 2, 3 and 4 is a plate 5. Secured to the plate 5 by means of rivets or bolts 6 is a plate 7 having a roll 8, to which the hinged member 9 is hinged, by means of the cotter pin 10. The outer portion of the hinge member 9 is U-shaped in cross section, as shown. Pivoted in the U-shaped portion, by means of the bolt 11 is a beam 12, which is U-shaped in cross section. A coil spring 13 is mounted on the bolt 11 having one arm thereof engaging the beam, while the other engages the hinge member 9. This spring acts to hold the beam downwardly or substantially horizontal, so that the portions 14 and 15 of the member 9 and the beam 12 will engage.

Extensively mounted in the beam 12 is an extension beam 16, the cross sectional contour of which conforms to the shape of the beam 12. This extension beam is provided with a plurality of apertures 17, and one of which is designed to receive the bolt 18, which extends through the apertures 19 adjacent the extremity of the beam 12. By virtue of the apertures 17 and 19 and the bolt 18, the extension beam may be telescopically extended or withdrawn.

An angular bracket 20 is provided. The base 21 of this bracket is bolted adjacent the outer end of the extension beam 16 by means of bolts 22, while the upper and outer portion of the bracket terminates into a threaded extension 23, to which a nut 24 is threaded. Pivoted on the extension 23 between the shoulder 26 and the nut 24 is a gravitating row gaging arm 25. By throwing the beam 12 and the extension beam 16 on the other side of the plow beam, and throwing the row gaging arm over to a position opposite to that shown in Fig. 1, the distances between the rows may be gaged from the opposite side of the plow. By provision of the spring 13, the beam and its extension beam may be held yieldably adjacent the soil, so as to ride over projections, in case such projections are in the path thereof. The gaging arm being gravitating, the same may easily and readily drag in the row, as will be apparent.

From the foregoing it will be noted that there has been produced a novel, efficient and simple device for gaging the distances between rows, and one which has been found to be practicable.

The invention having been set forth, what is claimed as new and useful is:

1. In a row gaging device, a plow beam, a member hingedly carried thereby, and a yieldably spring actuated beam pivoted to the member and provided with a gravitating row gaging arm.

2. In a row gaging device, a plow beam, a member hingedly carried thereby, and a yieldably spring actuated beam pivoted to the member and provided with a gravitating row gaging arm, the member and the beam adapted to be adjusted so as to project from either side of the plow beam, while the row gaging arm is adapted to be flipped upon either side of the beam.

3. In a row gaging device, a plow beam, a yieldably spring actuated beam connected thereto including an extensible extension beam, means for permitting the extension beam to be adjusted, the extension beam having the gravitating row gaging member adapted to be flipped upon either side of the extension beam.

4. In a row gaging device, a plow beam, a beam movably projecting from the plow beam, the movable beam being U-shaped in cross section, and extension beam U-shaped in cross section telescopically received by the movable beam, means for holding the extension beam in adjusted positions, and angular member carried adjacent the free end of the extension beam and provided with a gravitating row gaging arm, adapted to be flipped upon either side of the extension beam.

5. In combination, a plow beam, a member hingedly connected thereto terminating at its outer end into a U-shaped portion, a beam pivoted in the outer U-shaped portion, means for limiting the pivoted beam to a substantially horizontal position with relation to the hinge member, means for allowing the pivoted beam to yield, and extension beam telescopically received by the pivoted beam, means for holding the extension beam adjusted with relation to the pivoted beam, an angular bracket carried at the outer end of the extension beam, a row gaging gravitating arm pivoted to the bracket and adapted to be flipped upon either side of the extension beam, the hinged member, the pivoted beam including the extension beam adapted to be flipped upon either side of the plow beam.

In testimony whereof I have signed my name to this specification in the presence of the subscribing witnesses.

ROBERT J. VIBBERT.

Witnesses:
M. D. ROBILZSCH,
GUS. L. BRACK,
D. E. BARKER.

---

Copies of this patent may be obtained for five cents each, by addressing the "Commissioner of Patents, Washington, D. C."